United States Patent
Eleftheriadis et al.

(10) Patent No.: US 11,175,711 B2
(45) Date of Patent: Nov. 16, 2021

(54) APPARATUS, METHOD AND SYSTEM FOR CONTROLLING POWER SUPPLY

(71) Applicant: Telefonaktiebolaget LM Ericsson (publ), Stockholm (SE)

(72) Inventors: Lackis Eleftheriadis, Gävle (SE); Christofer Flinta, Stockholm (SE); Athanasios Karapantelakis, Solna (SE); Aneta Vulgarakis Feljan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/635,598

(22) PCT Filed: Aug. 4, 2017

(86) PCT No.: PCT/EP2017/069801
§ 371 (c)(1),
(2) Date: Jan. 31, 2020

(87) PCT Pub. No.: WO2019/025005
PCT Pub. Date: Feb. 7, 2019

(65) Prior Publication Data
US 2020/0241616 A1  Jul. 30, 2020

(51) Int. Cl.
*G06F 1/28* (2006.01)
*G06F 1/26* (2006.01)
*G06F 1/3206* (2019.01)

(52) U.S. Cl.
CPC .............. *G06F 1/266* (2013.01); *G06F 1/28* (2013.01); *G06F 1/3206* (2013.01)

(58) Field of Classification Search
CPC ........... G06F 1/266; G06F 1/28; G06F 1/3206
See application file for complete search history.

(56) References Cited

U.S. PATENT DOCUMENTS

2011/0264937 A1* 10/2011 Meisner ................ G06F 1/3228
713/323
2013/0212410 A1   8/2013 Li et al.
(Continued)

FOREIGN PATENT DOCUMENTS

WO          2010077923 A2      7/2010

OTHER PUBLICATIONS

Nikolic, B., "How to Easily Measure Floating Point Operations Per Second (FLOPS)", Jan. 1, 2016, p. 1, retrieved on Sep. 4, 2012, retrieved from internet: http://www.bnikolic.co.uk/blog/hpc-howto-measure-flops.html.

*Primary Examiner* — Gary Collins
(74) *Attorney, Agent, or Firm* — Coats & Bennett. PLLC (57) ABSTRACT

A method in a power system infrastructure for controlling power supplied to a plurality of data processing machines, wherein the power system infrastructure comprises a plurality of power supply units, comprises receiving a plurality of power demand values, wherein the power demand values are associated with a respective plurality of data processing instances to be executed on the plurality of data processing machines. The method comprises estimating a total power demand value based on the received power demand values. The method comprises controlling the power system infrastructure to provide power to the plurality of data processing machines based on the estimated total power demand value.

14 Claims, 5 Drawing Sheets

(56) References Cited

U.S. PATENT DOCUMENTS

| | | | |
|---|---|---|---|
| 2014/0067139 A1* | 3/2014 | Berke | G06F 1/26 700/291 |
| 2015/0121113 A1* | 4/2015 | Ramamurthy | H02J 9/061 713/340 |
| 2015/0381237 A1 | 12/2015 | Griffith et al. | |

* cited by examiner

APPARATUS, METHOD AND SYSTEM FOR CONTROLLING POWER SUPPLY

TECHNICAL FIELD

The embodiments described herein relate to apparatus, methods and systems for controlling power supply, and in particular to apparatus, methods and systems for controlling power supplied by a power supply infrastructure to a plurality of data processing machines, for example servers in a data center.

BACKGROUND

Data centers consume a large amount of power. For example, power systems in data centers can support up to 200 KW of server workload. Most power systems used in data centers are over dimensioned and consume unnecessary power, and are typically built of several power supply units (PSUs) or rectifiers. Data centers consume about 100 times more power than a typical office building of the same size. In total that is estimated as being a staggering 80 million megawatt hours of electricity a year, representing nearly 2% of the global $CO_2$ emissions. With the addition of more than 575 million new servers every year, worldwide carbon emissions from data centers will most likely quadruple by 2020.

As a result, many infrastructure equipment manufacturers are working to improve energy savings on their equipment, for example by using higher direct current (DC) voltage or by improving the efficiency of power supply units (PSUs), or the efficiency of components such as rectifiers of such PSUs, that supply power to a server infrastructure of a data center.

Known power supply units tend to act in a reactive manner by only measuring the voltage and current of supplied power to the server infrastructure, whereby the power supply is controlled by taking measurements on the system bus voltage. Thus, many efficiency steps can be performed inside a power supply unit itself or inside the server infrastructure to improve the performance and achieve energy savings, for example by improving PSU (rectifier) efficiency, changing the distribution of power to a higher voltage, or controlling the PSU by measuring the current that is supplied to the server infrastructure.

When the workload is not so high on the equipment used in data centers, the power system can be configured to operate in an idle mode, however such idle modes also consume a significant amount of energy.

A problem with these types of known systems as described above is that, sole monitoring of the system voltage and current that is used inside the server or the power system infrastructure is not enough to provide energy savings on a total site, and to make efficiency energy management control.

SUMMARY

It is an aim of the embodiments described herein to provide a method, apparatus and system which obviate or reduce at least one or more of the disadvantages mentioned above.

According to a first aspect there is provided a method in a power system infrastructure for controlling power supplied to a plurality of data processing machines, wherein the power system infrastructure comprises a plurality of power supply units. The method comprises receiving a plurality of power demand values, wherein the power demand values are associated with a respective plurality of data processing instances to be executed on the plurality of data processing machines. The method comprises estimating a total power demand value based on the received power demand values. The method comprises controlling the power system infrastructure to provide power to the plurality of data processing machines based on the estimated total power demand value.

According to another aspect there is provided a control module for controlling power supplied to a plurality of data processing machines by a power system infrastructure, wherein the power system infrastructure comprises a plurality of power supply units. The control module comprises a processor and a memory, said memory containing instructions executable by said processor. The control module is operative to receive a plurality of power demand values, wherein the power demand values are associated with a respective plurality of data processing instances to be executed on the plurality of data processing machines. The control module is operative to estimate a total power demand value based on the received power demand values. The control module is operative to control the power system infrastructure to provide power to the plurality of data processing machines based on the estimated total power demand value.

According to another aspect, there is provided a system. The system comprises a data center comprising a plurality of data processing machines, and a power system infrastructure for supplying power to the data center, wherein the power system infrastructure comprises a plurality of power supply units. The system comprises a communication interface for communicating power demand information between the data center and power system infrastructure, wherein the power demand information is used to activate and/or deactivate one or more power supply units of the power system infrastructure.

BRIEF DESCRIPTION OF THE DRAWINGS

For a better understanding of examples described herein, and to show more clearly how the examples may be carried into effect, reference will now be made, by way of example only, to the following drawings in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail.

Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set computing (i.e. RISC) processor, a complex instruction set computing (CISC) processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

The embodiments described herein propose an apparatus, system and a method to improve the energy efficiency of a power system infrastructure which supplies power to a plurality of data processing machines, for example a plurality of servers in a data center, which may be used, for example, to reduce or eliminate the need for an idle power mode.

The control function described in the embodiments herein can be implemented in many ways, for example in a cloud operating system or orchestrator, such as Open Stack™, containers or in micro-service applications, or implemented directly in a hypervisor.

Figure 1:
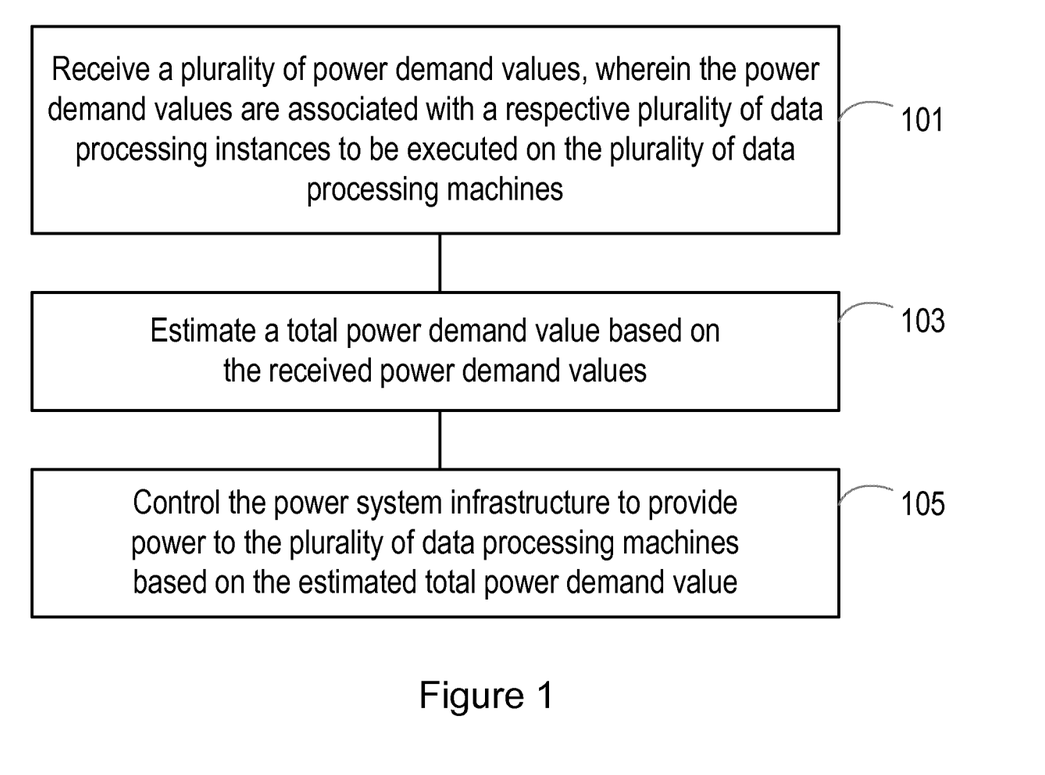
FIG. 1 shows an example of a method according to an embodiment.

FIG. 1 shows a method in a power system infrastructure according to an embodiment, for controlling power supplied to a plurality of data processing machines, wherein the power system infrastructure comprises a plurality of power supply units. The method comprises receiving a plurality of power demand values, wherein the power demand values are associated with a respective plurality of data processing instances to be executed on the plurality of data processing machines, step 101.

The method comprises estimating a total power demand value based on the received power demand values, step 103.

The method comprises controlling the power system infrastructure to provide power to the plurality of data processing machines based on the estimated total power demand value, step 105.

As will be described later in the application, the receiving of power demand values and controlling of the power system architecture is made possible by a communications interface between the power system infrastructure and an infrastructure comprising the plurality of data processing machines.

The receiving of power demand values associated with data processing instances means that the power system infrastructure can estimate a total power demand, so that the power system infrastructure can be controlled to provide the required amount of power, for example by activating and/or deactivating power supply units, PSUs, of the power system infrastructure (as described later). Such control of the PSUs, based on a total power demand value, can be used for example to avoid the need to keep PSUs in an idle power mode, or reduce the idle power mode requirement.

Thus, active operations can be made to activate/deactivate the PSUs to eliminate or reduce the idle power consumption based on expected demand between server and power system infrastructures.

To quantify the workload on the data processing machines, e.g. servers in a data center, different metrics may be used.

In one example, a power demand value relates to a performance per watt, PPW, value associated with a data processing machine.

PPW is a measure of the energy efficiency of a particular computer architecture or computer hardware of a data processing machine. A PPW value is a measure of the rate of computation that can be delivered by a computer for every watt of power consumed. Therefore, in some examples GFLOPS (Giga Floating Point Operations Per Second) per watt values relating to different processors may be used to form at least part of a power demand value. In some examples, a power demand value may relate to a value which has been obtained from running benchmark tests on different processors that may be used in data processing machines. For example, a Linpack™ value is a benchmark and stress test utility used to determine a floating point processing power of a system or a cluster of systems by asking it to solve complex mathematical problems. In another example, a Wprime™ value is a multi-threaded benchmark test which tests the performance of a processor by calculating and refining a complex square root calculation, for example a problem size of 1024 m, whereby the quicker the processor is able to return an accurate result the better it performs. Such Linpack™ and/or Wprime™ values, or other benchmark values, may therefore form at least part of a power demand value in some examples.

In another example, a power demand value relates to a number of active or idle central processing units, CPUs, associated with the plurality of data processing machines, and/or an utilization rate related to hard disk drives, HDDs, associated with the plurality of data processing machines.

In such examples using idle CPU as a metric and/or HDD utilization rate as a metric, the granularity of measuring workload does not have to be so finely grained, and instead the workload is indicated by the number of active or idle CPUs and the CPU, HDD utilization rate. These metrics may be detected, for example, using system statistics reporting tools, such as "collectd" on Unix™, MAC OS, Solaris™, AIX™, xBSD™ systems and Task Manager™ on Microsoft Windows™.

According to another example a power demand value may relate to a predicted amount of data to be processed by the plurality of data processing machines. In some examples, a power demand value comprises a power demand profile that varies over a period of time.

When basing a power demand value on an amount of data to be processed, this may involve determining a measure of workload using data sent to one or more data processing machines for processing, for example data sent to containers, and by correlating the amount of data with the processing load.

In some embodiments the power demand values are based on "real" measurements, for example based on real-time or historical data in connection with how much energy is required to run a particular data processing instance or data processing task. In such embodiments a power demand value may be determined based on power measurements performed while a data processing instance is being executed, or based on power measurements that have been performed on a recently executed data processing instance.

According to other embodiments, a power demand value is determined based on information embedded with a data processing instance, whereby the embedded information provides an indication of the power demand required to execute that data processing instance. In such embodiments a control function may therefore be based on the power consumption, and workload that is calculated from information embedded into a blueprint of the data processing instance or instances to be deployed. Each blueprint may consist of several sections that describe different actions on the data processing instance or instances to be deployed.

It is noted that a data processing instance can be defined in different levels of abstractions, the lowest ones being for example memory data or processor register operations (e.g. moving data from one register to another), with higher ones relating for example to execution and convergence of algorithms, e.g. in functions.

The use of blueprint information associated with data processing instances or data processing operations enables power consumption to be mapped from the blueprint information when determining a total power demand.

It is noted that in some embodiments, a mixture or real time measurements and blueprint information may be used to estimate a total power demand.

From the above it can be seen that the energy consumption of the computational and storage processes executed inside the data processing machine (e.g. server) are measured in one way or another. This energy consumption can be compared with the total power system infrastructure that is used, which is also known.

Using this information and the communication interface between the server and the power system (i.e. between the plurality of data processing machines and power system infrastructure), the method can then deactivate and/or activate one or several power supply units, e.g. PSUs or rectifiers, forming part of the power system infrastructure. This can help eliminate or reduce the idle power. This procedure may involve comparing via the container function of a virtual machine, VM, the data and power used in the data processing machine and the power consumption used in the power system infrastructure.

It is noted that the workflow data on data processing machines such as servers will be known, including for example in advance, e.g. when a tenant is specifying new VMs to be launched, or specifying VMs to be closed down. By using this information, the power supply units of the power system infrastructure can be turned ON or OFF in advance to save energy. For example, if there are no jobs running in the VM then, the orchestrator of the VM/container can deactivate a corresponding rectifier which normally supplies power, and in this way save power.

An advantage of the embodiments described herein is that the power system infrastructure can have lower margins between an allocated power and an estimated power demand, since an anticipated increase in demand can be used to scale up the power supply before the demand is launched. This avoids the power needs of a data center comprising a plurality of servers or data processing machines to be allocated with a higher margin in order to catch unforeseen fluctuations in power consumption, thereby avoiding the power wastage associated with such margins which are higher than necessary.

It is noted that a method performed via an orchestrator can handle many cores, whereby VMs correlate the VM's based on their conditions and send a signal (power demand value) to the power system of an actual power demand. Power prediction can therefore be made and correlated in peak Floating Point Operations Per Second (FLOPS) per Watt inside a local manager.

Figure 2:
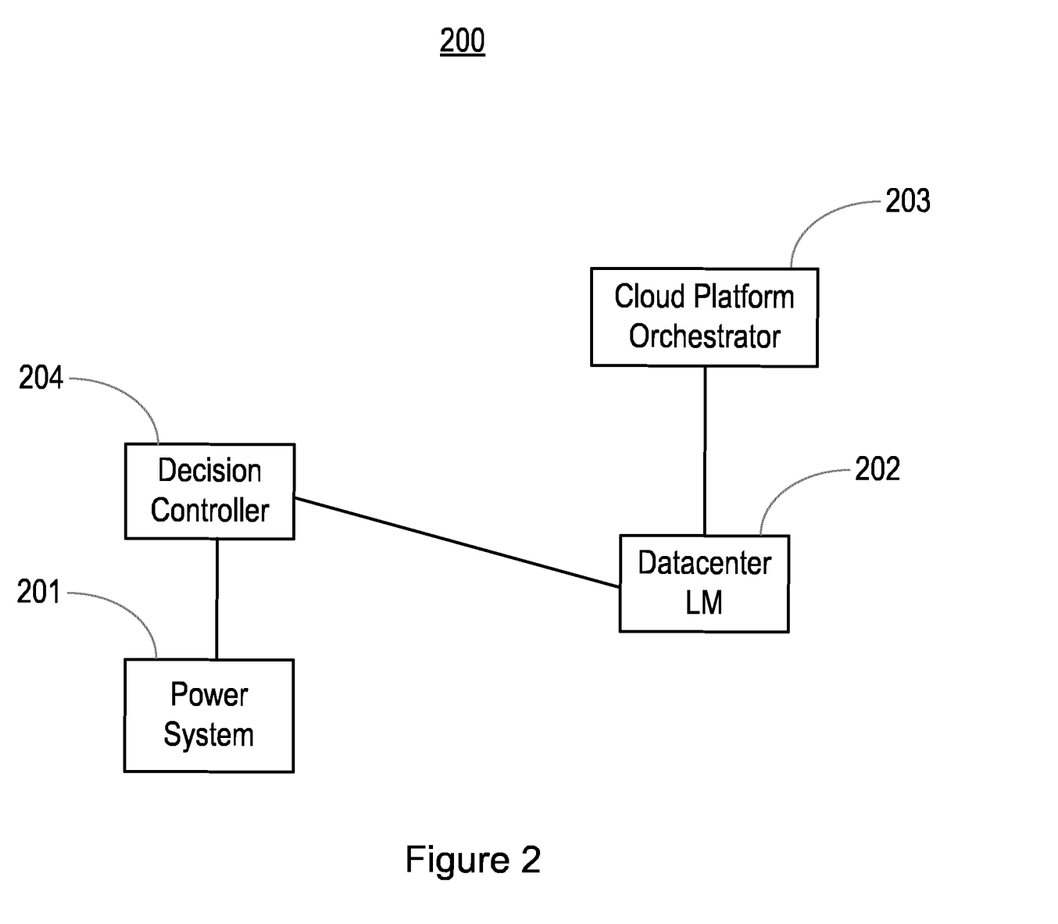
FIG. 2 shows an example of an embodiment.

FIG. 2 shows an example of a system overview according to an embodiment. The system 200 comprises a power system infrastructure 201 that supplies power, for example to a data center 202. The power system infrastructure 201 may comprise a plurality of power supply units (not shown), and the data center 202 may comprise a plurality of data processing machines, for example servers (not shown).

The system 200 comprises a orchestrator node 203, for example a cloud platform orchestrator. In this example the orchestrator node 203 is a node that:

(a) has control over the data processing instances in the data center 202 (e.g. VMs or containers, etc.). It can be likened for example to software such as OpenStack Heat™, Terraform™, Kubernetes™, Docker Compose™, Canonical JuJu™, Ansible™, etc., (b) has information about what the hardware resources of the data center are (e.g. in terms of how many physical CPU cores, RAM and HDD exist) and how they are used, (c) can manipulate data processing instances either on its own discretion or by exposing an API to third party entities, e.g. users. By manipulation it is meant deployment, up/down scaling, suspending/hibernating, pausing, etc.

It is noted that the orchestrator node 203 may be co-located with the data center node 202 (as per the sequence diagram example described later in FIG. 3).

The data center node 202 can be adapted to calculate the consumption of a single data processing instance or service topology (a collection of instances) using data from the orchestrator node 203. This can be done by applying some of the approaches for calculating a power demand on the plurality of data processing machines as outlined in the examples above, i.e. to determine the workload on the server/servers of the data center node 202, for example using PPW or on a higher granularity using core utilization rate, or even a data-driven approach.

In one example, a consumption calculation may have the following structure:

workload on a server or servers in the data center
<424rewrwr43242, 40, [0,3]>, <424rewrwr43242, 50-60, (3, 5]>, <424rewrwr43242, 40, (5, 60]>

In the structure above, a data processing instance or service topology having an identifier, ID, of 424rewrwr43242 will consume 40 Watts of energy for the first 3 seconds, then 50 to 60 watts for the next 2 seconds, and finally 40 watts for the next 55 seconds. It is noted that the structure shown above is non limiting, and that other structures may be used, including for example popular XML-based or JSON formats.

The system 200 comprises a decision controller node 204. Although shown as being separate, it is noted that the decision controller node 204 may be co-located, or form part of the power system infrastructure 201. The decision controller node 204 receives consumption information, i.e. power demand values, and makes a decision on whether to turn regulators of the power system infrastructure 201 on or off. The decision can be based on the total power supplied to the system, and the power requested from various data processing instances.

The power system infrastructure may comprise a programmable entity which supplies power to the data center node 202. Programmability may include the power system infrastructure node 201 exposing an API for accepting instructions to turn regulators on or off, for example as described in the sequence diagram of FIG. 3 below.

It is noted that the components of the system 200 may comprise logical components. Therefore, as mentioned above the data center node 202 may form part of the same physical node as the power system infrastructure 201, and/or the orchestrator node 203. The latter is because the orchestrator node 203 may already know the consumption profile of the data processing instances being deployed and also has control over the physical resources and how they are used. All of this information can be used by the data center node 202 to perform the consumption calculation, i.e. to determine a total power demand.

It is noted that the decision controller node 204 can also share the same hardware resource as the data center node 202, or can be located elsewhere.

In one embodiment the orchestrator node may comprise an OpenStack™ cloud platform. Thus, one embodiment may have the proposed function implemented in the orchestrator of a cloud platform, e.g. in Heat™ in the Open Stack platform.

When a tenant creates new VMs or virtual networks the Heat orchestrator knows how much maximum power these virtual devices will use and reports this extra power demand to the power system before the VMs or networks are launched. The power system can then adjust its power to this extra demand before the new VMs will use the extra power.

In the same way, when a tenant shuts down VMs or networks the Heat orchestrator sends signals about the reduced demand to the power system, which can then turn off parts of the power supplies if possible. The reported power demand can be based on of how much power each CPU core uses, according to supplier specifications.

After the launch of VMs or networks the demand can be adjusted by the orchestrator node 203 by monitoring the launched CPUs in the data center node 202. The proposed function may estimate the demand based on statistics from the aggregated CPU load.

According to another embodiment the proposed function may be implemented in a micro-service based application, where the micro services are implemented in containers, using e.g. Docker™ or Kubernetes™. When a new application is to be launched the orchestrator node 203 will know the anticipated power demand and reports it to the power system infrastructure 201. The demand can be based on statistics of the behaviour of the micro services in the application. An example is when a web site is launched, which consists of a web server and a database. The CPU demand for the web server and the database can be estimated based on historic data for that type of application and sent to the power system infrastructure 201 in advance before the application is launched. After the launch, the demand can be adjusted according to the recent CPU load history.

Further details will now be provided in connection with blueprint information that may be provided for determining a power demand according to some embodiments described herein.

With such embodiments, a total power demand may be determined using information in the blueprint, rather than that measured or calculated in a data center node 202, whereby consumption information is embedded into the blueprint of the data processing instance or instances to be deployed.

A power demand value can be determined based on information embedded with a data processing instance, whereby the embedded information provides an indication of the power demand required to execute that data processing instance.

According to one example, a blueprint may comprise of several sections that describe different actions for the virtual application, for example:
Upload
Deploy
Delete
Pause
Scale Up
Scale Down These actions involve workflows, i.e. scripted sequences of steps that need to be done sequentially or sometimes in parallel to fulfil the action.

In each of these actions an energy cost/consumption in order for the action to be achieved can be associated therewith in the blueprint information.

Because the blueprint information is independent of a particular hardware platform, the power consumption can differ depending on the hardware underneath. However, it is desirable that an objective measure of power consumption exists for every action prior to the orchestration, so the power supply units of the power system infrastructure can be turned ON or OFF as previously described.

To solve this issue, according to one embodiment a two stage process may be provided.

According to a first stage, upon registration (i.e. upload) of a blueprint to an orchestrator node 203, the orchestrator node 203 profiles the application, e.g. all of the deploy, delete, scale up/down operations, as a step of the registration process, and attaches to each action in the blueprint the calculation of a unit of computation such as Floating Point Operations Per Second (FLOPS) or Millions of Instructions Per Second (MIPS) or their multiples and divisors (e.g. Giga FLOPS or GFLOPS). This profiling process may use known processes for determining the FLOPS, MIPS or GFLOPS associated with an application.

The example code shown below shows a TOSCA/Cloudify™ blueprint with the appended information, the changes being highlighted in bold. It is noted that in the example below, there are flops requirements for specific instances but also for the application at-large (which includes in this case the MySQL™ instance and the NodeJS™ instance). Typically an orchestrator node 203 would treat this blueprint on application granularity, however since it is also possible to instantiate different nodes of the application individually, energy consumption descriptions are included for individual nodes as well.

tosca_definitions_version: cloudify_dsl_1_0
imports:
 - http://www.getcloudify.org/spec/cloudify/3.2/types.yaml -continued

```
        - http://www.getcloudify.org/spec/openstack-plugin/1.2/plugin.yaml
        - http://www.getcloudify.org/spec/fabric-plugin/1.2/plugin.yaml
node_types:
    db_host:
        derived_from: cloudify.openstack.nodes.Server
        properties:
            cloudify_agent:
                default:
                    user: ubuntu
                    wait_started_timeout: 60
            server:
                default:
                    image: 35c2fca9-1f72-498a-8112-a8d46e7f3096
                    flavor: 2
                    availability_zone: nova
                    security_groups:['cloudify-sg-agents']
                    name: MySQLDB
    application_host:
        derived_from: cloudify.openstack.nodes.Server
        properties:
            cloudify_agent:
                default:
                    user: ubuntu
                    wait_started_timeout: 60
            server:
                default:
                    image: 78b4d23c-3a57-4n95-656e-1s57856781ng
                    flavor: 2
                    availability_zone: nova
                    security_groups:['cloudify-sg-agents']
                    name: NodeJSApp
node_templates:
    applicationHost:
        type: application_host
        relationships:
            - target: webApp_floatingIP
              type: cloudify.openstack.server_connected_to_floating_ip
    webApp:
        type: cloudify.nodes.ApplicationServer
        relationships:
            - type: cloudify.relationships.contained_in
              target: applicationHost
        interfaces:
            cloudify.interfaces.lifecycle:
                register: register-webApp.sh
                deploy: deploy-webApp.sh
                pause: pause-webApp.sh
                delete: delete-webApp.sh
                interface_requirement:
                    measurement_unit: GFLOPS
                    register: 3
                    deploy: 5
                    pause: 4
                    delete: 3
    databaseHost:
        type: db_host
    databaseApp:
        type: cloudify.nodes.ApplicationServer
        relationships:
            - type: cloudify.relationships.contained_in
              target: databaseHost
        interfaces:
            cloudify.interfaces.lifecycle:
                register: register-dataBase.sh
                deploy: deploy-dataBase.sh
                pause: pause-dataBase.sh
                delete: delete-dataBase.sh
                interface_requirement:
                    measurement_unit: GFLOPS
                    register: 11
                    deploy: 12
                    pause: 14
                    delete: 9
    webApp_floatingIP:
        type: cloudify.openstack.nodes.FloatingIP
        properties:
            use_external_resource: true
            resource_id: 61c78086-19e6-43c3-94bf-63cc95c22622
```

In the code above, the sections shown in bold denote how computationally heavy each orchestrator action is on a blueprint.

According to a second stage of this process, when an action on a blueprint data processing instance is triggered, the data center node 202 can retrieve the power demand values (e.g. computation requirements expressed in GFLOPS) directly from the blueprint, instead of doing expensive calculations.

Different approaches can be taken according to different embodiments. According to one example, the computation requirements can be mapped to watt consumption using a table that stores GFLOPS/Watt values for different processors.

According to another example the real consumption of the system can be measured and attached to the blueprint. Such an example will, over time, yield more accurate results of consumption.

According to another example a hybrid solution may be used, where the first of the above approaches is used initially, until a statistically safe set of real measurements from the second approach is available, whereby the system subsequently uses the second approach.

As such, a method according to an embodiment may comprise performing a registration process by executing a data processing instance on a particular data processing machine, and adjusting the embedded information based on the power consumed by the executing of the data processing instance on the particular data processing machine.

Performing the registration process may comprise:
a) mapping a computation requirement to a power consumption; or
b) measuring an actual power consumption of a particular data processing instance, and using the measured power consumption as the embedded information; or
c) performing a hybrid solution whereby step (a) is performed during an initial time period, followed by step (b) being performed during a subsequent time period.

A benefit of this method is that procedure (a) is performed until a statistically safe set of real measurements from procedure (b) is available, before switching to procedure (b).

The blueprint information enables a power system infrastructure to be controlled to provide power to a plurality of data processing machines, by activating and/or deactivating one or more of power supply units forming part of the power system infrastructure.

From the above it can be seen that, by knowing the traffic flow inside a data center node 202, the actual data corresponding to power is well known, and it is known in advance before it is executed or transmitted to a next site. Based on the fact that the power demand of the data is known in advance, the power system infrastructure can be controlled on site and save energy, by turning ON/OFF the specified power supply units of the power system infrastructure, e.g. turning ON/OFF certain rectifiers.

The embodiments provide a prediction based on a timeframe, and report the estimated power demand or need of the actual power of the server.

Figure 3:
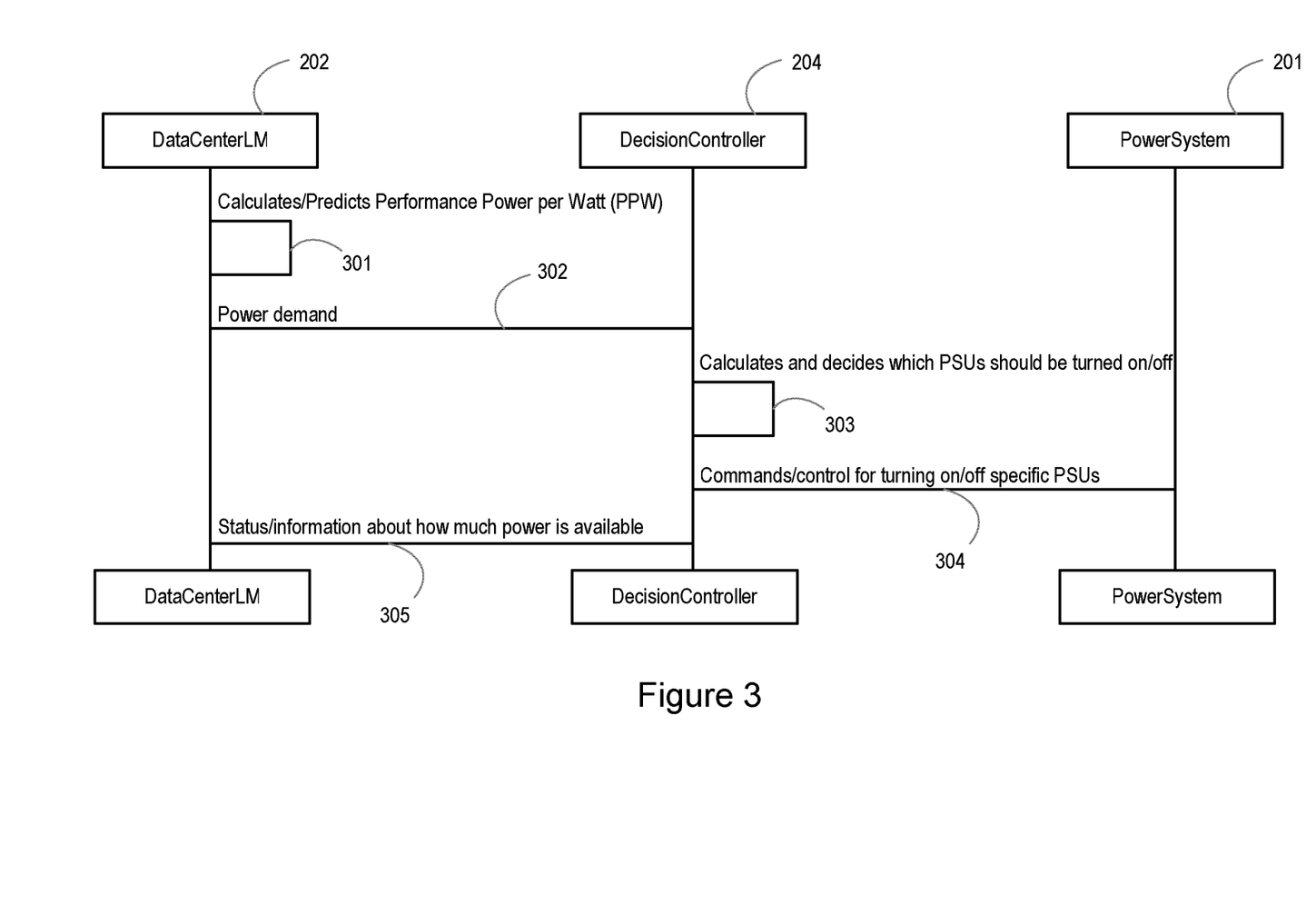
FIG. 3 shows an example of a method according to an embodiment.

FIG. 3 shows an example of a method according to an embodiment, to help illustrate the flow of information between various nodes in a system, i.e. a data center node 202, a decision controller node 204 and a power system infrastructure node 201. As noted previously, one or more of these nodes may be co-located or combined, either physically or logically. For example, an orchestrator node (not shown) may form part of the data center node 202.

In step 301 a data center node 202 calculates or predicts a performance power per watt (PPW) value, for example associated with one or more data processing machines located at the data center.

In step 302 the data center node 202 sends a power demand value to a decision controller node 204. Upon receipt of the power demand value(s), the decision controller node 204 determines which power supply units of the power system infrastructure 201 are to be activated and/or deactivated. This may comprise determining a total power demand based on one or more power demand values being received at the decision controller node 204.

In step 304 the decision controller node 204 is configured to control the power system infrastructure 201 to provide power to one or more data processing machines of the data center, based on the estimated total power demand value. This may involve activating and/or deactivating specific power supply units.

In step 305, the decision controller node 204 may provide status information to the data center node 202, for example about how much power is available.

The method described above can be repeated, such that the power system infrastructure is dynamically controlled to provide a required amount of power to the data center node, according to a predicted total power demand, e.g. by dynamically activating and/or deactivating specific power supply units that form the power system infrastructure.

Figure 4:
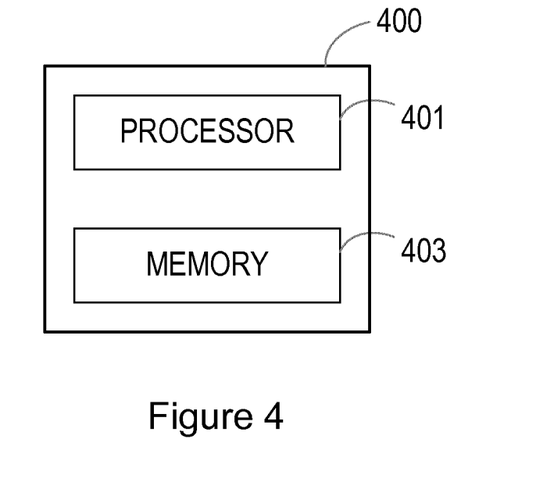
FIG. 4 shows an example of a control module according to an embodiment.

FIG. 4 shows an example of a control module 400 for controlling power supplied to a plurality of data processing machines by a power system infrastructure, wherein the power system infrastructure comprises a plurality of power supply units. The control module 400 may comprise, for example, the decision control node 204 of FIGS. 2 and 3 above. The control module 400 may be a stand-alone node, or form part of one or more other nodes as described herein.

The control module 400 comprises a processor 401 and a memory 403, said memory 403 containing instructions executable by said processor 401. The control module 400 is operative to receive a plurality of power demand values, wherein the power demand values are associated with a respective plurality of data processing instances to be executed on the plurality of data processing machines. The control module 400 is further operative to estimate a total power demand value based on the received power demand values. The control module 400 is further operative to control the power system infrastructure to provide power to the plurality of data processing machines based on the estimated total power demand value.

The control module 400 may be further adapted to perform a method as described above.

Figure 5:
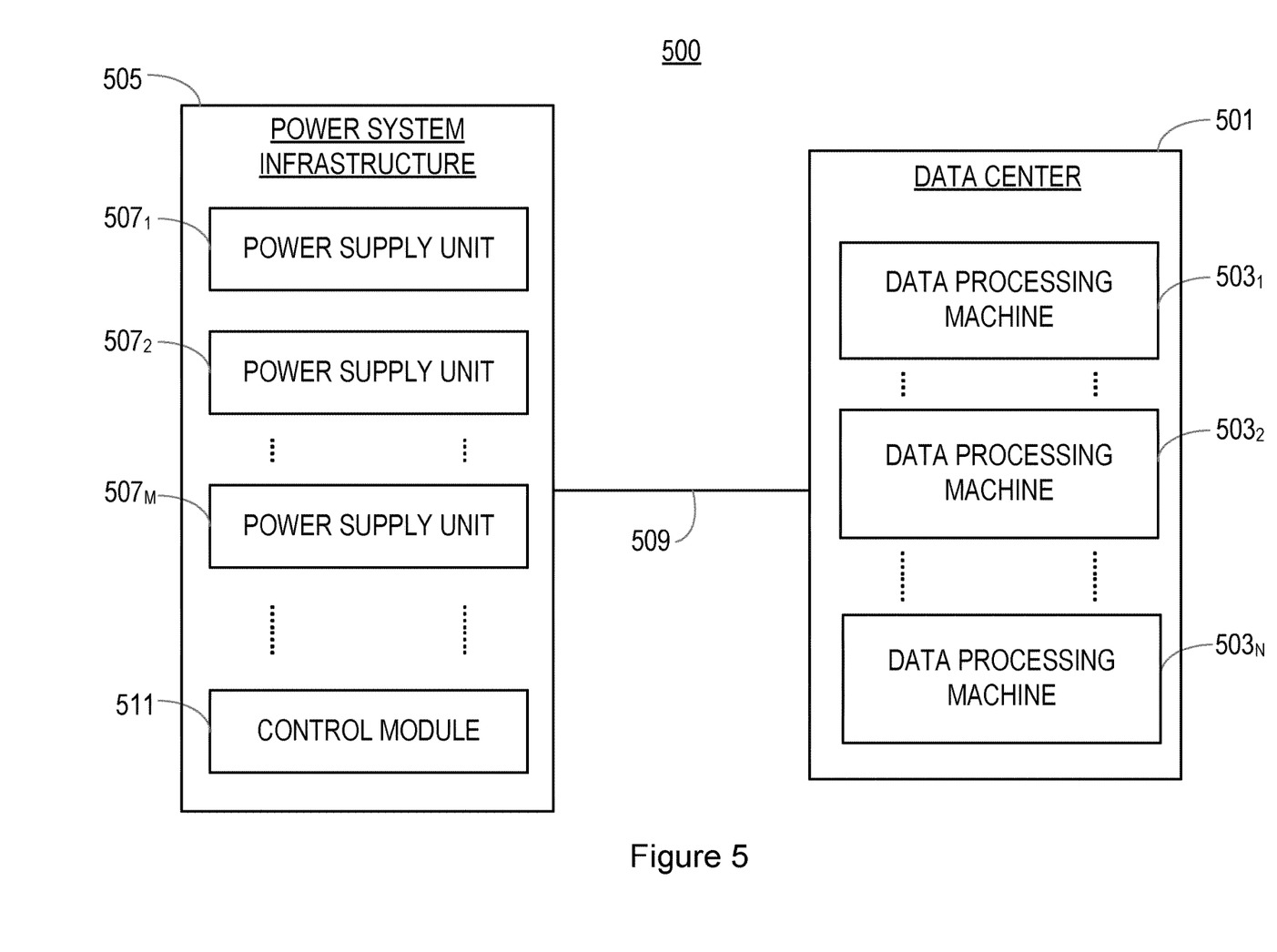
FIG. 5 shows an example of a system according to an embodiment.

FIG. 5 shows an example of a system 500 according to another embodiment. The system 500 comprises a data center 501, the data center 501 comprising for example a plurality of data processing machines $503_1$ to $503_N$, for example servers. The system 500 comprises a power system infrastructure 505 for supplying power to the data center 501, and hence the plurality of data processing machines $503_1$ to $503_N$ It is noted that the power connections, per se, are not shown. The power system infrastructure 505 comprises a plurality of power supply units $507_1$ to $507_M$, for example PSUs or rectifiers for supplying power.

The system 500 comprises a communication interface 509 for communicating power demand information between the data center 501 and power system infrastructure 505, wherein the power demand information is used to activate and/or deactivate one or more power supply units $507_1$ to $507_M$ of the power system infrastructure.

The system 500 comprises a control module 511, in this example shown as being co-located with the power system infrastructure. The control module 511 is adapted to receive a plurality of power demand values from the data center 501, wherein the power demand values are associated with a respective plurality of data processing instances to be executed on the plurality of data processing machines $503_1$ to $503_N$ of the data center 501. The control module 511 is adapted to estimate a total power demand value based on the received power demand values. The control module is adapted to control the power system infrastructure 505 to provide power to the plurality of data processing machines $503_1$ to $503_N$ based on the estimated total power demand value.

The control module 511 may be further adapted to perform a method as described herein.

Although the power system infrastructure 505 is shown separately to the data center 501, it is noted that these functions may be co-located. It is also noted that the data center 501 may comprise a control module, for example an orchestrator control module as described earlier, to assist with the determination of power demand values for one or more data processing instances, or other power requirements, of the data processing machines $503_1$ to $503_N$.

The embodiments described above enable an efficient power supply system to be put in place for controlling data centers, including for example cloud computing infrastructures. The embodiments provide communication for coupling between power supply systems and the servers that they supply. In some embodiments, servers have communication means for communicating information to other infrastructure equipment, e.g. for enabling the power supply to such servers to be controlled. Servers may also communicate with other infrastructure equipment, such as cooling equipment in data centers.

The control functions described above can be implemented in many ways, for example in a cloud operating system or orchestrator, like Open Stack™, containers or in micro-service applications. In some embodiments the control functions can be implemented directly in a hypervisor, whereby the control function may compare the workload and the power system rectifier idle power.

The operation between power system and server infrastructure takes advantage of an interface provided between the power system infrastructure side and the server infrastructure side to enable communication for control, which can improve energy savings by creating a map between processes that are going to be run and a power demand, e.g. in Watts.

By providing communication to a power system on site, energy improvements are not limited to partial optimizations (e.g. concerning one component of the data center such as the servers), but are applicable more widely to the data center as a system.

The embodiments described herein enable the amount of energy consumed in an idle power mode of operation to be reduced, or to be eliminated by avoiding the need for an idle mode (i.e. by activating and deactivating one or more power supply units from a plurality of power supply units instead).

The embodiments allow energy savings to be obtained, for example energy savings of 0.5% for each PSU/rectifier, by turning ON/OFF the PSU/rectifier as described above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a power system infrastructure for controlling power supplied to a plurality of data processing machines; the method comprising:
   receiving a plurality of power demand values, wherein the power demand values are associated with a respective plurality of prospective data processing instances to be prospectively executed, but not currently being executed, on the plurality of data processing machines; wherein the power demand values are based on historical data about how much energy is required to run a particular prospective data processing instance;
   estimating a total power demand value based on the received power demand values; and
   controlling the power system infrastructure to provide power to the plurality of data processing machines based on the estimated total power demand value; wherein the power system infrastructure comprises a plurality of power supply units.

2. The method of claim 1, wherein a power demand value relates to a performance per watt value associated with a data processing machine.

3. The method of claim 2, wherein a power demand value is determined based on information embedded with a data processing instance, whereby the embedded information provides an indication of the power demand required to execute that data processing instance.

4. The method of claim 3, further comprising:
   performing a registration process by executing a data processing instance on a particular data processing machine; and
   adjusting the embedded information based on the power consumed by the executing of the data processing instance on the particular data processing machine.

5. The method of claim 4, wherein the performing the registration process comprises:
   a) mapping a computation requirement to a power consumption; or
   b) measuring an actual power consumption of a particular data processing instance, and using the measured power consumption as the embedded information; or
   c) performing a hybrid solution whereby step (a) is performed during an initial time period, followed by step (b) being performed during a subsequent time period.

6. The method of claim 1, wherein a power demand value relates to a number of active or idle central processing units associated with the plurality of data processing machines, and/or a utilization rate related to hard disk drives associated with the plurality of data processing machines.

7. The method of claim 1, wherein a power demand value relates to a predicted amount of data to be processed by the plurality of data processing machines.

8. The method of claim 1, wherein a power demand value comprises a power demand profile that varies over a period of time.

9. The method of claim 1, wherein the controlling the power system infrastructure to provide power to the plurality of data processing machines comprises activating and/or deactivating one or more of the power supply units forming part of the power system infrastructure.

10. The method of claim 1, wherein the plurality of data processing machines comprise a plurality of server devices forming part of a data center.

11. A control module for controlling power supplied to a plurality of data processing machines by a power system infrastructure, the control module comprising:
    processing circuitry;
    memory containing instructions executable by the processing circuitry whereby the control module is operative to:
       receive a plurality of power demand values, wherein the power demand values are associated with a respective plurality of prospective data processing instances to be prospectively executed, but not currently being executed, on the plurality of data processing machines; wherein the power demand values are based on historical data about how much energy is required to run a particular prospective data processing instance;
       estimate a total power demand value based on the received power demand values; and
       control the power system infrastructure to provide power to the plurality of data processing machines based on the estimated total power demand value; wherein the power system infrastructure comprises a plurality of power supply units.

12. The control module of claim 11, wherein a power demand value relates to a performance per watt value associated with a data processing machine.

13. A system comprising:
    a data center comprising a plurality of data processing machines;
    a power system infrastructure for supplying power to the data center; the power system infrastructure comprising a plurality of power supply units; and
    a communication interface for communicating power demand information between the data center and power system infrastructure;
    a control module configured to:
       receive a plurality of power demand values from the data center, wherein the power demand values are associated with a respective plurality of prospective data processing instances to be prospectively executed, but not currently being executed, on the plurality of data processing machines in the data center; wherein the power demand values are based on historical data about how much energy is required to run a particular prospective data processing instance;
       estimate a total power demand value based on the received power demand values; and
       control the power system infrastructure to provide power to the data center based on the estimated total power demand value;
    wherein the system is configured to use the power demand information to activate and/or deactivate one or more power supply units of the power system infrastructure.

14. The system of claim 13, wherein a power demand value relates to a performance per watt value associated with a data processing machine.

* * * * *

UNITED STATES PATENT AND TRADEMARK OFFICE
CERTIFICATE OF CORRECTION

PATENT NO. : 11,175,711 B2
APPLICATION NO. : 16/635598
DATED : November 16, 2021
INVENTOR(S) : Eleftheriadis et al.

It is certified that error appears in the above-identified patent and that said Letters Patent is hereby corrected as shown below:

On the Title Page

Item (56), under "OTHER PUBLICATIONS", in Column 2, Line 2, delete "p. 1," and insert -- pp. 1, --, therefor.

Item (74), under "Attorney, Agent, or Firm", in Column 2, Line 1, delete "Coats & Bennett. PLLC" and insert -- Coats & Bennett, PLLC --, therefor.

In the Specification

In Column 1, Line 54, delete "efficiency" and insert -- efficient --, therefor.

In Column 3, Line 17, delete "(ASIC)" and insert -- (ASIC(s)) --, therefor.

In Column 4, Line 50, delete "an" and insert -- a --, therefor.

In Column 6, Line 23, delete "a orchestrator" and insert -- an orchestrator --, therefor.

In Column 7, Line 46, delete "on of" and insert -- on --, therefor.

In Column 7, Line 61, delete "web site" and insert -- website --, therefor.

In Column 8, Lines 47-48, delete "Millions of Instructions Per Second (MIPS)" and insert -- Million Instructions Per Second (MIPS) --, therefor.

In Column 11, Line 2, delete "performance power per watt (PPW)" and insert -- performance per watt (PPW) --, therefor.

Signed and Sealed this
Eighteenth Day of April, 2023

Katherine Kelly Vidal
*Director of the United States Patent and Trademark Office*

CERTIFICATE OF CORRECTION (continued)
U.S. Pat. No. 11,175,711 B2

In the Claims

In Column 13, Line 9, in Claim 1, delete "machines; the" and insert -- machines, the --, therefor.

In Column 13, Line 32, in Claim 3, delete "execute that" and insert -- execute the --, therefor.

In Column 14, Line 36, in Claim 13, delete "center; the" and insert -- center, the --, therefor.